United States Patent [19]

Drew, Jr.

[11] 4,149,846

[45] Apr. 17, 1979

[54] METHOD AND MEANS OF INSULATING WATER-COOLED PIPES IN A FURNACE

[75] Inventor: Thomas A. Drew, Jr., Baytown, Tex.

[73] Assignee: United States Steel Corporation, Pittsburgh, Pa.

[21] Appl. No.: 800,127

[22] Filed: May 24, 1977

[51] Int. Cl.$^2$ .............................. F27B 9/14; F16L 9/10

[52] U.S. Cl. ...................................... 432/234; 138/141; 138/149; 138/DIG. 1; 156/215; 266/281

[58] Field of Search ........................ 432/3, 4, 233-236; 266/281; 138/147, 148, 149, 145, 146, 141, DIG. 1; 156/215

[56] References Cited

U.S. PATENT DOCUMENTS

| | | | |
|---|---|---|---|
| 675,447 | 6/1901 | McMahon | 138/141 |
| 1,811,984 | 6/1931 | Taft | 138/149 |
| 2,925,831 | 2/1960 | Welty et al. | 138/141 |
| 3,080,893 | 3/1963 | Graycraft | 138/141 |
| 3,226,101 | 12/1965 | Balaz et al. | 432/234 |
| 3,647,194 | 3/1972 | Brungraber et al. | 432/234 |
| 3,722,550 | 3/1973 | Matthews | 138/141 |
| 3,946,763 | 3/1976 | Wilce | 138/149 |
| 4,015,636 | 4/1977 | Van Fossen | 138/149 |
| 4,070,151 | 1/1978 | Suey | 432/234 |
| 4,093,760 | 6/1978 | O'Malley | 432/234 |
| 4,095,937 | 6/1978 | Colburn et al. | 432/234 |

*Primary Examiner*—Henry C. Yuen
*Attorney, Agent, or Firm*—Walter P. Wood

[57] ABSTRACT

A method and means of insulating water-cooled pipes in a reheating furnace for metal workpieces. The pipes are wrapped with flexible ceramic fiber blankets held in place with an organic adhesive capable of withstanding temperatures up to about 500° F.

2 Claims, 3 Drawing Figures

FIG. 1.
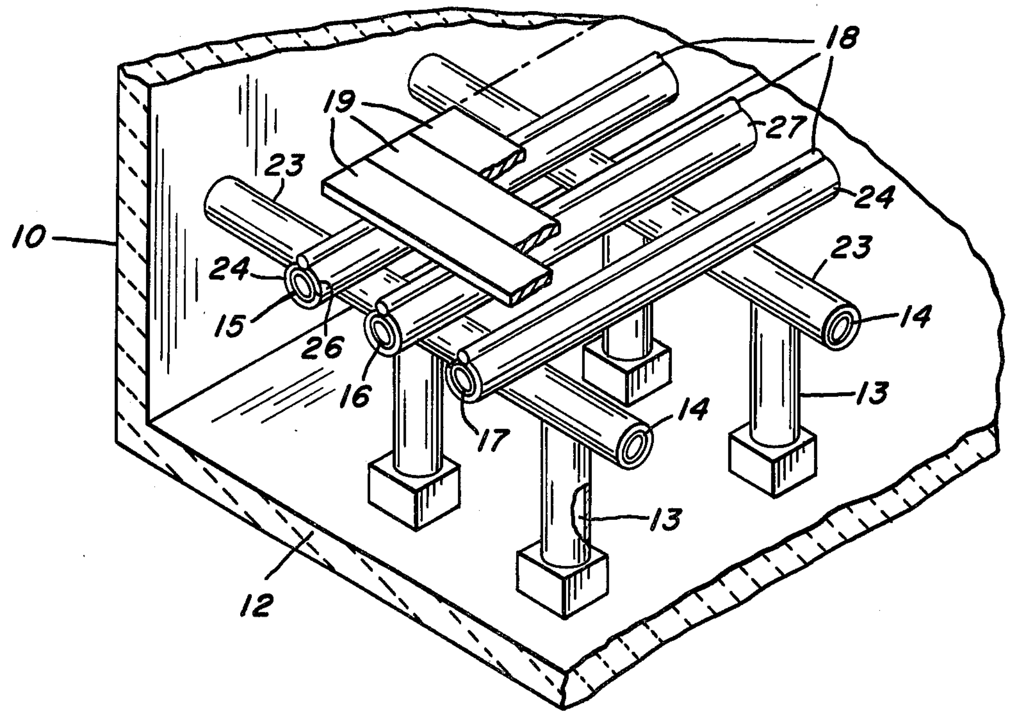
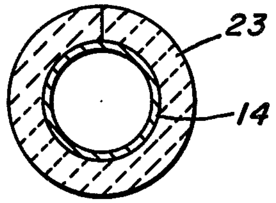
FIG. 2.
FIG. 3.
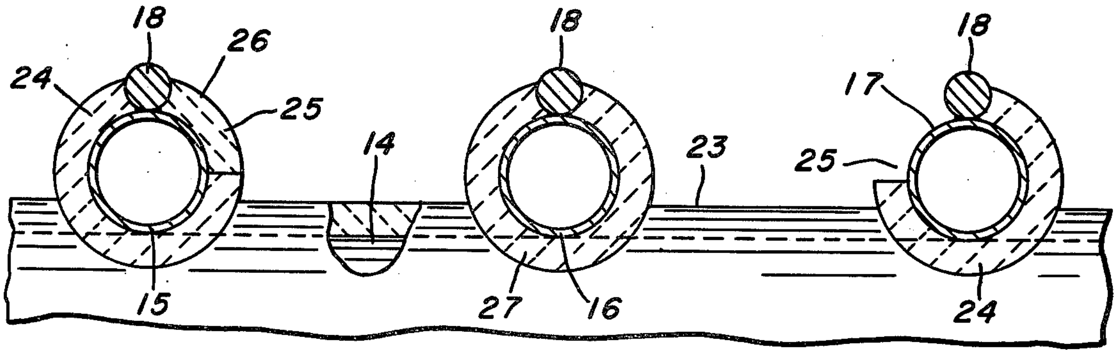

METHOD AND MEANS OF INSULATING WATER-COOLED PIPES IN A FURNACE

This invention relates to an improved method and means of insulating water-cooled pipes which support metal workpieces in a reheating furnace.

A conventional furnace for reheating metal workpieces, such as steel slabs or billets, to bring them to a temperature for hot rolling includes skid rails on which the workpieces ride as they move through the furnace and water-cooled pipes supporting the rails. The presence of water-cooled pipes within a furnace of course causes a loss of heat. To minimize heat losses and also to protect the pipes against direct exposure to the heat of the furnace, it is known to cover the pipes with a heat-insulating material. Reference can be made to Greaney, U.S. Pat. No. 3,329,414 or Boto et al., U.S. Pat. No. 3,820,947, both of common ownership, for exemplary showings of insulated pipes used heretofore.

Previous pipe-insulating means have not been altogether satisfactory. The Greaney patent shows rigid semicircular refractory tiles held on the pipes with a high temperature air setting mortar. In practice these tiles permit a heat loss of about 14,000 Btu per sq. ft. per hour, which is a substantial improvement over the loss from bare pipe of about 40,000 Btu, but still is undesirably high. The tiles also are brittle and easily broken. The Boto et al. patent shows flexible ceramic fiber blankets wrapped around the pipes and held in place with studs welded to the pipes. After the blankets are in place, a "rigidizer" is applied to their surfaces. In practice the studs quickly burn off and the ceramic fiber falls away. The rigidized blanket also becomes brittle and is easily broken. Both these forms of insulation are unduly costly.

An object of my invention is to provide an improved method and means of insulating water-cooled pipes in a reheating furnace and overcoming difficulties encountered previously, that is, to provide less costly insulating means which not only has greater life but also is more effective in diminishing heat losses.

A further object is to provide an improved pipe insulating method and means in which the pipes are wrapped with flexible ceramic fiber blankets held in place with an organic adhesive capable of withstanding high temperatures, thereby obtaining a low-cost highly effective insulating means.

In the drawing:

FIG. 1 is a fragmentary diagrammatic perspective view of a portion of a reheating furnace in which the pipes are insulated in accordance with my invention;

FIG. 2 is a sectional view on a larger scale showing the insulation as applied to one of the upright or transverse supporting pipes of the furnace; and FIG. 3 is a vertical section on a scale similar to FIG. 2 showing the insulation applied to the longitudinal pipes on which the skid rails are mounted.

FIG. 1 shows a portion of a conventional reheating furnace which includes side walls 10, a floor 12, upright pipes 13, transverse pipes 14 supported by the upright pipes, and three longitudinal pipes 15, 16 and 17 supported by the transverse pipes. Alternatively the transverse pipes can be formed integrally with the upright pipes, known in the art as "hairpins". Skid rails 18 are mounted on the upper faces of the longitudinal pipes and provide support for workpieces 19 as they move through the furnace to be reheated. As known in the art, water circulates through the pipes to prevent their overheating. The means for introducing water, as well as other parts of the furnace, are not shown since they are not involved in the invention.

As shown in FIG. 2, I wrap flexible ceramic fiber blankets 23 fully around the upright pipes 13 and the transverse pipes 14. The blankets may be formed of a known alumina silicate material. Suitable materials are available commercially from Carborundum Company as "Fiberfrax H". The blankets preferably have a thickness of at least 1 inch. I spread an organic adhesive on one face of each blanket section before wrapping it around a pipe. I use masking tape to hold the sections in place temporarily until the adhesive sets. The masking tape of course burns off when the furnace is heated. The adhesive must be capable of withstanding temperatures up to about 500° F. My preferred adhesive is an epoxy resin. One example of a satisfactory epoxy is available commercially from Gulf Specialties Company, Houston, Tex., as #1500N, along with catalyst #140-U.

FIG. 3 illustrates the way in which I cover the longitudinal pipes 15, 16 and 17. I use ceramic fiber blankets and adhesive similar to the blankets and adhesive already described. I wrap the blankets 24 around approximately three-quarters of the circumference of the two outside pipes 15 and 17 extending from the outside edges of the rails 18, and leaving gaps 25 extending down from the inside edges of the rails. Workpieces 19 frequently strike the pipes below the inside edges of the skid rails and tend to knock loose any insulation applied in these areas. Alternatively I may apply separate strips 26 of the same insulating material and same adhesive within one or both gaps 25, as shown on pipe 15 at the left. If strip 26 is knocked loose, the major portion of the pipe remains insulated, or the strip can be replaced readily. I wrap the intermediate pipe 16 (and any other intermediate pipe if there are more than three) with blankets 27 which extend from one edge of the skid rails to the other.

I particularly wish to avoid the use of studs or other protruding fastening means for affixing the blankets to the pipes. As already mentioned, experience has domonstrated that such fastening means burns off, leaving nothing to hold the insulation. I avoid also applying any rigidizer, such as embrittles the insulating blanket, but leave the blankets in their original flexible state. A blanket applied in accordance with my invention permits a heat loss of only about 2300 btu per sq. ft. of insulated surface per hour, and can be applied cheaply by unskilled workmen.

I claim:

1. In a furnace for reheating metal workpieces to temperatures for hot-rolling, which furnace includes:

a plurality of water-cooled pipes;

skid rails mounted on the upper faces of said pipes; and additional water-cooled pipes supporting said first-named pipes to enable said skid rails to support workpieces for reheating;

the combination therewith of improved means of insulating said pipes comprising:

flexible ceramic fiber blankets wrapped around said pipes and held in place with an organic adhesive capable of withstanding temperatures up to about 500° F.;

said first-named pipes including two outside pipes and at least one intermediate pipe, the blankets on said outside pipes being wrapped around approximately three-quarters of the pipe circumference extending from the outside edges of said skid rails, leaving gaps extending from the inside edges where the pipes are subject to being struck by workpieces, the blanket on said intermediate pipe extending from one edge of said skid rail to the other;

said blankets remaining in their original flexible state and being exposed to the interior of the furnace after the furnace is heated.

2. A furnace as defined in claim 1 further comprising strips of insulating material inserted in said gaps said strips being of similar material to said blankets and similarly held in place.

* * * * *